United States Patent
Oraby et al.

(10) Patent No.: US 11,643,705 B2
(45) Date of Patent: May 9, 2023

(54) RECOVERY OF PRECIOUS AND CHALCOPHILE METALS

(71) Applicant: Mining and Process Solutions Pty Ltd, Caulfield North (AU)

(72) Inventors: Elsayed Abdelrady Oraby, Beckenham (AU); Jacobus Johannes Eksteen, Bull Creek (AU)

(73) Assignee: Mining and Process Solutions Pty Ltd, Caulfield North (AU)

( * ) Notice: Subject to any disclaimer, the term of this patent is extended or adjusted under 35 U.S.C. 154(b) by 137 days.

(21) Appl. No.: 16/638,249

(22) PCT Filed: Aug. 13, 2018

(86) PCT No.: PCT/AU2018/050852
§ 371 (c)(1),
(2) Date: Feb. 11, 2020

(87) PCT Pub. No.: WO2019/033154
PCT Pub. Date: Feb. 21, 2019

(65) Prior Publication Data
US 2020/0172994 A1 Jun. 4, 2020

(30) Foreign Application Priority Data
Aug. 14, 2017 (AU) ................................ 2017903251

(51) Int. Cl.
*C22B 15/00* (2006.01)
*C22B 3/16* (2006.01)
*C22B 11/00* (2006.01)

(52) U.S. Cl.
CPC ............ *C22B 15/0067* (2013.01); *C22B 3/16* (2013.01); *C22B 11/04* (2013.01)

(58) Field of Classification Search
CPC ........ C22B 15/0067; C22B 3/16; C22B 11/04
(Continued)

(56) References Cited

U.S. PATENT DOCUMENTS

| 5,279,803 | A | 1/1994 | Clough |
| 8,097,227 | B2 * | 1/2012 | Hackl ....................... C22B 3/20 |
| | | | 423/22 |

(Continued)

FOREIGN PATENT DOCUMENTS

| CN | 104109762 | 10/2014 |
| WO | 2015031943 | 3/2015 |

(Continued)

OTHER PUBLICATIONS

International Search Report for Application No. PCT/AU2018/050852 dated Sep. 25, 2018 (3 pages).

(Continued)

*Primary Examiner* — Melissa S Swain
(74) *Attorney, Agent, or Firm* — Michael Best & Friedrich LLP

(57) ABSTRACT

A process for recovery of one or more elements, selected from precious metals and chalcophile metals, as herein defined, from materials containing precious and/or chalcophile metal/s, said process including: (i) contacting the material with an alkaline solution containing a lixiviant comprising an amino acid, or derivative thereof, and an alkali stable transition metal complex in order to form a leachate containing the precious metal and/or chalcophile metal; and (ii) recovering the precious metal and/or chalcophile metal from the leachate.

18 Claims, 10 Drawing Sheets

(58) Field of Classification Search
USPC .......................................................... 423/27
See application file for complete search history.

(56) References Cited

U.S. PATENT DOCUMENTS

| | | | |
|---|---|---|---|
| 2014/0127096 A1* | 5/2014 | Komon | C22B 3/1625 |
| | | | 423/158 |
| 2016/0281192 A1* | 9/2016 | Komon | C22B 3/1625 |
| 2017/0166994 A1* | 6/2017 | Wystra | C22B 3/14 |

FOREIGN PATENT DOCUMENTS

| | | | | |
|---|---|---|---|---|
| WO | WO-2015031943 A1 * | 3/2015 | ............. | C22B 11/04 |
| WO | 2016141438 | 9/2016 | | |
| WO | WO-2016141438 A1 * | 9/2016 | ............... | C22B 3/12 |

OTHER PUBLICATIONS

International Preliminary Report on Patentability for Application No. PCT/AU2018/050852 dated Dec. 5, 2019 (3 pages).
Oraby et al., "The leaching of gold, silver and their alloys in alkaline glycine-peroxide solutions and their adsoprtion of carbon," Hydrometallurgy, 2015, vol. 152, pp. 199-203.

* cited by examiner

RECOVERY OF PRECIOUS AND CHALCOPHILE METALS

TECHNICAL FIELD

A process is disclosed for the recovery of one or more elements, selected from precious metals and chalcophile metals, from materials containing precious and/or chalcophile metal/s. The process may be used to recover metals from ores, ore concentrates, intermediates from mining processes, or mining waste such as tailings. The process may also be used to recover metals from other metal containing materials including jewelry, electronic scrap and other scrap materials. The process may be particularly used in the context of leaching low grade ores, ore concentrates, ore intermediates or tailings. It may also be used for leaching process intermediates, electro-refining sludge, dross, speiss, mattes and slags from the metallurgical industry and/or other secondary or waste materials. The process may also be used to remove these metals from—metal contaminated soils for soil reclamation, detoxification and clean-up.

As used herein, the term "precious metal" means gold (Au), silver (Ag) and the platinum group metals: ruthenium (Ru), rhodium (Rh), palladium (Pd), osmium (Os), iridium (Ir), and platinum (Pt). However, of these precious metals, the process is particularly applicable to the recovery of gold and/or silver, and discussion will therefore focus on these two precious metals.

As used herein, the term "chalcophile metal" means copper (Cu), nickel (Ni), cobalt (Co), zinc (Zn), lead (Pb), cadmium (Cd), thallium (Tl), indium (In), mercury (Hg), gallium (Ga), tin (Sn) and bismuth (Bi), germanium (Ge) and arsenic (As).

BACKGROUND ART

Applicant's international patent application PCT/AU2014/000877 discloses leaching of copper and/or precious metals, using an alkaline, amino acid lixiviant. The process has a number of advantages, including the use of environmentally friendly and low cost reagents under alkaline pH conditions. In the case of leaching gold, it was found that leaching rates at ambient temperatures were too slow and that a number of measures were required to accelerate the leaching process to achieve practical leach rates. Such measures included moderate heating (such as to 60° C.), the addition of an oxidant or the addition of a leaching catalyst (such as a cupric species) was required. However, these modifications lead to increasing operating expenses and/or the introduction of impurities with attendant downstream processing complications. The introduction of copper in particular can be problematic due to its co-adsorption and competition with gold during adsorption onto activated carbon, or during cementation with zinc powder or iron metal powder.

It would accordingly be desirable to provide an improved leaching process that retained the advantages of amino acid leaching but operated with an accelerated leaching rate without introduction of problematical impurities that causes problems with contamination of the targeted precious or chalcophile when the precious or chalcophile metals are to be recovered from solution, such as by processes of adsorption (by activated carbon or other solid), precipitation, reduction, electrowinning, ion exchange solvent extraction, cementation (for example by Merrill-Crowe process for precious metals).

The above references to the background art do not constitute an admission that the art forms a part of the common general knowledge of a person of ordinary skill in the art. The above references are also not intended to limit the application of the process as disclosed herein.

SUMMARY OF THE DISCLOSURE

In a first aspect there is disclosed a process for recovery of one or more elements, selected from precious metals and chalcophile metals, as herein defined, from materials containing precious and/or chalcophile metal/s, said process including:
  (i) contacting the material with an alkaline solution containing a lixiviant comprising an amino acid, or derivative thereof, and an alkali stable transition metal complex in order to form a leachate containing the precious metal and/or chalcophile metal; and
  (ii) recovering the precious metal and/or chalcophile metal from the leachate.

In a second aspect there is disclosed an alkaline leaching solution containing a lixiviant comprising an amino acid, or derivative thereof, and an alkali stable transition metal complex.

As used herein, the term "amino acid" means an organic compound containing both a carboxyl (—COOH) and an amino (—NH$_2$) functional group. For ease of discussion, the term "amino acid" is intended to include derivatives of amino acids. The derivatives may include amino acid salts, such as alkali metal salts, for example, a sodium or potassium glycinate, or alkaline earth salts, for example a calcium salt. The derivative may alternatively or in addition comprise a peptide.

In many cases, the amino acid contains a —CHR or CH$_2$ group. In most cases the amino (—NH$_2$) group and the carboxyl (—COOH) group connects to the same —CHR or —CH$_2$ connecting group and are referred to primary α-amino-acids. The "R" group in the —CHR connecting group can take on any organic structure, such as aliphatic hydrocarbon groups to complex organic structures including aromatic groups, heterocyclic groups, and poly-nuclear groups or various other organic groups. In its simplest form, the R-group is only hydrogen, in which case the molecule reverts to the simplest primary α-amino-acid, called glycine. The amino acid may comprise one or more of Glycine, Histidine, Valine, Alanine, Phenylalanine, Cysteine, Aspartic Acid, Glutamic Acid, Lysine, Methionine, Serine, Threonine, and Tyrosine.

Amino acid concentration may be less than 250 g/L. In some embodiments, the amino acid concentration is less than 100 g/L In some embodiments, the amino acid concentration is less than 30 g/L. The amino acid concentration may be a minimum of 0.05 g/L, but in most embodiments is a minimum of 0.1 g/L. In some embodiments, it is 1 g/L or higher, such as 2 g/L or higher. The maximum amino acid concentration may be 20 g/L.

As used herein, the term "alkali stable transition metal complex" refers to an aqueous complex comprising of the following (non-chalcophile) transition metals (wherein "transition metal" is defined as including lanthanides), used either on their own or in combination with each other:
  Iron (in its ferrous ($Fe^{II}$) or ferric ($Fe^{III}$) or ferrate (VI) states)
  Cerium (in its cerous ($Ce^{III}$) or cerric ($Ce^{IV}$) states)
  Titanium (in its tinanous ($Ti^{III}$) or titanic ($Ti^{IV}$) states)

Chromium (in any of its oxidised states)
Vanadium (in any of its oxidised states)
Manganese (in any of its oxidised states)

In an embodiment, the alkali stable transition metal complex is an iron complex. Iron is a common by-product of many mining processes and is therefore readily available and relatively inexpensive. Manganese is also a common by-product of many mining processes, although it is less abundant than iron.

The descriptor "alkali stable" refers to complexes of these said lithophile transition metals that are stable (without precipitation) in aqueous solutions above a pH of 7. Accordingly, the transition metal may be present in the complex in any of its oxidised states, or as a mixture of these states. For example, iron can be present in its alkali stable iron complex in any of its ferrous ($Fe^{II}$), ferric ($Fe^{III}$) or ferrate (VI) states, or a combination of these. If and when beneficial, the alkali stable transition metal complexes may also contain mixtures of the transition metals referenced above, in the states useful as leach catalysts. The higher valency form is often the more effective rate enhancer. For example the trivalent form is the more effective rate enhancer than the divalent form. The higher valency form can be regenerated from the lower valency form by oxidation. Complete conversion from the lower valency form to the higher valency form is not required in the alkali stable transition metal complex in order for it to function as a rate enhancer.

Oxidation may be effected using one or more oxidants including oxygen (gaseous or dissolved), air, ozone (gaseous or dissolved), hydrogen peroxide, manganese dioxide, hypochlorite or dissolved chlorine, but are not limited to these.

Addition of an oxidant (such as air, oxygen or other) may be done in many ways, either by adding it prior to leaching, or during leaching.

These transition metals are typically not soluble to any significant extent in aqueous amino acid solutions under alkaline conditions (they normally precipitate as their oxides/hydroxides). However, the present inventors recognised that there are certain ligands of which the resulting transition metal complexes are so stable that the transition metal remains complexed even at high pH levels. On their own, these "alkali-stable" transition metal complexes (at the equivalent low levels that can be used when glycine is present), cannot dissolve precious or chalcophile metals to any appreciable extent. At very high (uneconomically high) concentrations some may dissolve precious metals to a limited extent.

The present inventors discovered that when alkali-stable transition metal complexes were introduced into alkaline amino acid leaching solutions, a synergistic effect was observed that resulted in significantly accelerated leaching of precious metals and chalcophile metals which was several times (such as one or two orders of magnitude) greater than the mere summation of the respective leaching rates attributable to the amino acid and the transition metal complex when used individually and at similar levels. Even more surprisingly, the alkali-stable transition metal complexes that are suitable for the present process may often be used as additives in the food industry, e.g. anti-caking agents. This is particularly the case for iron complexes. In addition, it was found that these alkali-stable transition metal complexes did not interfere significantly with the recovery of the precious and chalcophile metals from solution. For example, in the presence of the alkali stable complexes of ferrous and ferric iron, these iron complexes did not interfere with the recovery of gold and silver from their glycinate (amino acid) complexes during either zinc cementation (e.g. Merrill-Crowe) or adsorption onto activated carbon.

The pH of the leaching solution is alkaline. It may be 7 or higher when the process is conducted at ambient temperature. In most embodiments, pH would be 8 or higher and often may be 10 or higher. The pH may range up to 13.

The temperature of the leaching process may be any temperature where water is stable as a liquid (under atmospheric or elevated pressures). An advantage of the present process is that it may be conducted at ambient temperatures with satisfactory leaching rates. Temperatures can typically vary between 0 and 100 degrees Celsius, however, broader ranges can be foreseen dependent upon the system pressure. The maximum temperature range can be from −50 degrees Celsius to 220 degrees Celsius. Pressures can vary from 0.01 atmosphere (absolute) up to 100 atmospheres (absolute). Preferred temperatures would lie between −5 and 60 degrees Celsius. In an embodiment, the temperature lies between 15 and 60 degrees Celsius.

The leaching solution may be produced using pure water, any potable water, ground water, sea water or hypersaline brines. In some cases, the leaching solution may be derived from process solutions, such as from a mine site, and may therefore contain impurities arising from upstream processing steps. If the leaching solution was derived from a process solution, it may inadvertently and unintentionally contain background (eg <100 ppm) concentrations of one or more halides (such as iodine or triodide complex ($I_3^-$) and oxyhalide anions (such as bromate, chlorate, iodate), nitrate, nitrite, ammonia, cyanide, thiosulfate, sulfates, thiourea, thiocyanates, humic acids, fulvic acids or cyanates, either as their salts or free acids. These background contaminants may appear in lieu of upstream or legacy conditions, and are not required to be present, nor do they influence the leaching negatively to any appreciable extent.

Examples of appropriate ligands for the alkali stable transition metal complexes are:
  Carboxylic and dicarboxylic acid salts e.g. acetate, oxalate (e.g. ferric oxalate), malonic acid.pH-Stable cyanide complexes (such as the salts of ferrocyanic and ferricyanic acid, e.g. potassium ferrocyanide and potassium ferricyanide)
  Hydroxy-carboxylic acids and their salts, such as the salts of gluconic, citric, tartaric, lactic, malic,
  Ethylene Diamine Tetra-acetic Acid (EDTA) and its salts.

Examples of suitable alkali stable transition metal complexes, in the case of iron, include potassium ferrocyanide, potassium ferricyanide, ferro gluconate, ferri gluconate, ferro citrate, ferri citrate, ferro/ferri tartrate, ferro/ferri ethylene diamine tetra-acetic acid (EDTA) salt. In one embodiment, the transition metal complex comprises one or more of ferro/ferricyanide, ferric gluconate and ferric EDTA.

Alkali stable transition metal complexes may also be present as their oxidised anionic complexes such as chromate, permanganate, manganate, titanate, ferrate, and vanadate.

The transition metal can also be partially substituted by one or more of ammonium ions, alkali and alkali earth metal ions. For example, the complexes may be derived from a double salt containing alkali, or alkali earth mixtures. Accordingly, the leaching solution may comprise a mixture of amino acids (e.g. glycine) at pH>7 with a transition metal-complex as identified above, but may contain alkali (e.g. $Na^+$, $K^+$ or other, including ammonium ion $NH_4^+$) or alkali-earth (e.g. $Ca^{2+}$ or $Mg^{2+}$ or other) salts of these complexing ligands as well.

The transition metal complex may be present in solution at a low concentration, such as less than 50 g/L. Preferably, the concentration is less than 15 g/L, and in some embodiments, is less than 10 g/L. In other embodiments, the concentration is less than 5 g/L. The minimum concentration of transition metal complex may be 0.05 g/L, such as 0.1 g/L. In some embodiments, the minimum concentration is 1 g/L.

The process further includes the step of recovering the precious metals and/or chalcophile metals from the leachate. The recovery process from solution may include any one or more of the following processing steps: Carbon adsorption, ion exchange (IX), adsorption, solvent extraction (SX), precipitation, membrane separations including nanofiltration, micro and ultrafiltration and reverse osmosis, crystallization, or molecular recognition technology (MRT), cementation (with a metal that would be able to reduce the precious or chalcophile metal from solution, such as Merrill Crowe cementation of precious metals with zinc metal powder). Carbon adsorption and/or ion exchange may occur either on the leachate itself, or it may occur in the presence of a pulp/slurry/suspension containing the precious/chalcophile metal-bearing material. Examples include carbon-in-column (CIC), carbon-in-pulp (CIP) and carbon-in-leach (CIL). Other alternatives may include (IX) resin-in-column (RIC), resin-in-pulp (RIP), and resin-in-leach (RIL).

The use of alkaline-stable transition metal complexes instead of leaching catalysts such as cupric ions also has benefits for metal recovery from solution. As copper addition to the leaching solution can be eliminated, copper contamination in downstream recovery is avoided, such as copper co-adsorption onto activated carbon, or co-reduction of copper during Merrill-Crowe and other similar cementation steps. In contrast to copper salts that can be reduced to copper metal and which show a reasonably high affinity for activated carbon, alkali-stable transition metal-complexes cannot be reduced to their metals in aqueous solutions (unlike precious metals or chalcophile metals which are typically reducible to elemental/metallic state from their solutions), nor do they adsorb to problematical levels onto activated carbon when in alkaline solutions. This enables the transition metal complex to remain in solution for reuse and limits its contamination in downstream processing.

After leaching the precious or chalcophile metals are recovered from solution using any of the processes identified above (e.g. carbon-based adsorption, ion exchange, etc.). The residual solid which has been leached of its chalcophile/precious metals is now partially or wholly depleted of these chalcophile/precious metals.

The precious/chalcophile metal is recovered from their aqueous complexes, leaving the bulk of the amino acid lixiviant and alkali-stable transition metal-complex behind in the aqueous solution (raffinate, or barren solution) depleted of the precious or chalcophile metal. The raffinate/barren solution may then be recycled to be reused in the leach. It may be necessary to add additional pH modifier (such as calcium oxide or calcium hydroxide or magnesium hydroxide, or caustic soda, or soda ash or sodium bicarbonate, or other oxides, hydroxides or carbonate salts of the alkali or alkali-earth metals) to re-establish the pH to be within the alkaline pH range before recycling back to the leach. The solution may alternatively be disposed of.

Accordingly, the present process comprises leaching a precious metal and/or chalcophile metal bearing solid material with a leach system comprising water (of variable purity) as matrix-solvent, amino acids (or their salts or derivatives) as lixiviants, in the presence of alkali-stable transition metal-complexes used at low levels (such as less than 10 g/L). An oxidant may be present in the system (such as, but not limited to, air, oxygen, hydrogen peroxide, calcium peroxide, ozone, manganese dioxide, chlorates, bromates, iodates, persulfates, nitrates, bromate, bromine, iodate, iodine or tri-iodide complex ($I_3^-$), hypochlorous acid, chlorous acid, chloric acid or perchloric acid, their derivatives, salts, or combinations thereof), and may be used to oxidise a lower oxidation state of the transition metal to its higher oxidation state. If an oxidant is present, it preferably comprises one of air, oxygen, hydrogen peroxide, calcium peroxide, manganese dioxide or permanganate. The oxidant may be added into the reaction mix at the point of reaction, or added externally in a step separate to leaching. However, an oxidant is not required in all cases.

Various contaminants or other anions may be present in the water in lieu of upstream processes or historic legacy issues, but which are not present in sufficient concentration to achieve economic extraction of the precious or chalcophile metals in the absence of additional lixiviant (eg amino acid). These contaminants or other anions may include one or more of cyanide, cyanate, thiosulfate, polythionates, thiourea, thiocyanate, ammonia, halides (such as chloride, bromide, iodide or triodide complex ($I_3^-$), cyclodextrin, sulfates, sulfites, nitrates, and salts of carboxylic acids/fatty acids, humic and fulvic acids, sugars, lipids, alcohols, esters and other amines.

The alkali-stable transition metal-complex is a synergistic catalyst to the alkaline amino acid system.

Accordingly, the potential benefits of the present process include:

1. Accelerated leach rates and overall leaching of the targeted precious and/or chalcophile metals.
2. Removal of problematic catalysts that impacts downstream processing.
3. New additives allow the reduction of the leach temperatures while achieving high leach rates.
4. Ease of retention of the alkali stable transition metal complex catalyst in the aqueous solution after recovery of the precious and/or chalcophile metals allowing easy recycling (with the glycine).

BRIEF DESCRIPTION OF THE DRAWINGS

Notwithstanding any other forms which may fall within the scope of the apparatus and method as set forth in the Summary, specific embodiments will now be described, by way of example only, with reference to the accompanying drawings in which.

DETAILED DESCRIPTION OF SPECIFIC EMBODIMENTS

FIGS. 1 to 4 show the results of leaching gold ore under various leaching conditions. All of the tests were performed using gold ores ground to a particle size of 100% passing 75 micron. Some tests were performed at room temperature (RT=20° C.), and in bottle rolls and others in stirred vessels at mildly elevated temperature. The maximum leach time was 48 hours in all cases.

Figure 1:
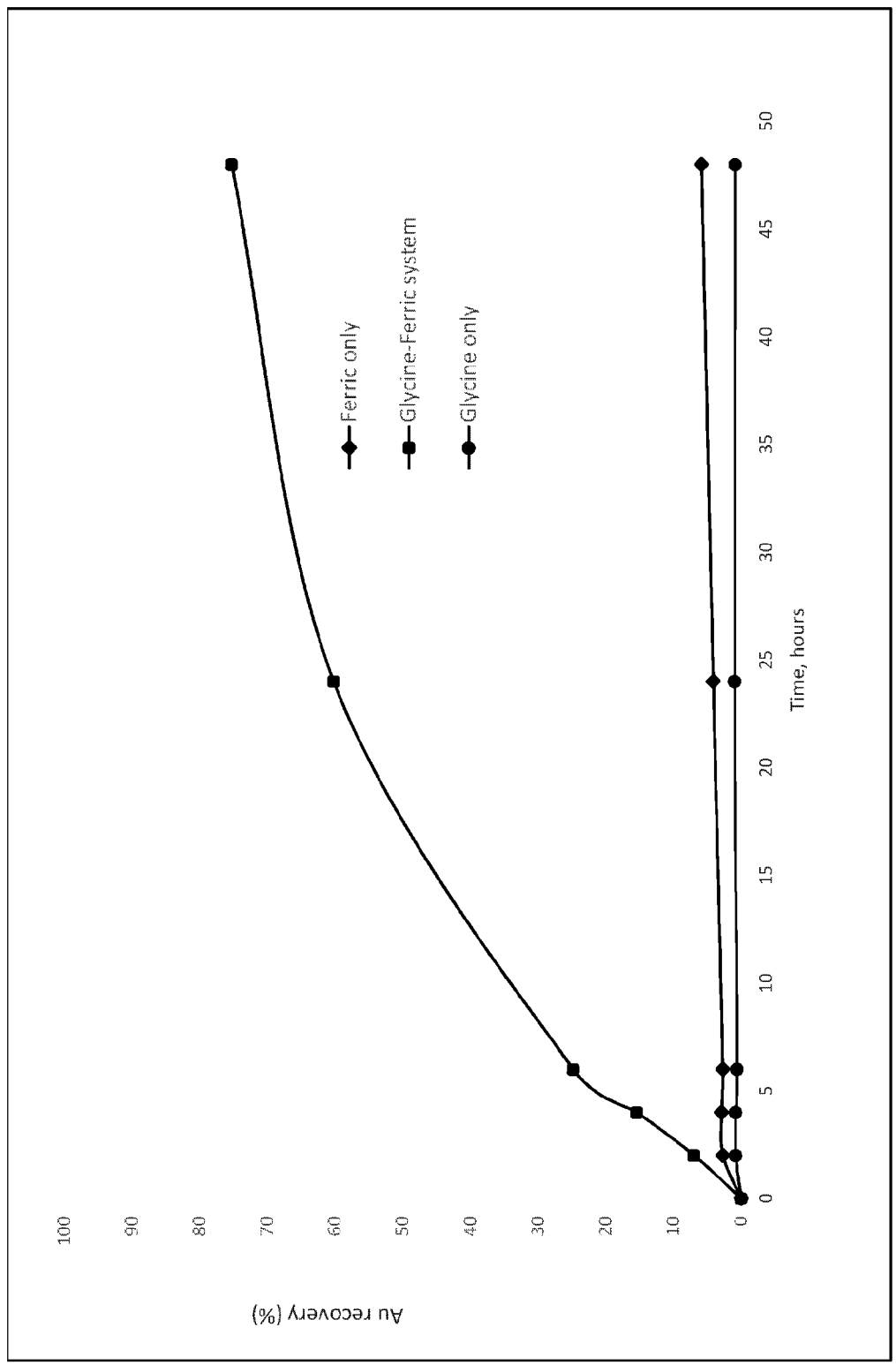
FIG. 1 is a graph of gold recovery (%) versus time (hours) for leaching gold ore using three different leaching solutions at room temperature: Fe complex only (diamonds), glycine only (circles) and Fe complex plus glycine (squares).

Referring firstly to FIG. 1, a graph is shown for gold recovery (%) versus time (hours) for leaching gold ore using three different leaching solutions at room temperature. All three solutions have a pH of 11.0 and a solids content of 33.3%. The circles represent a solution containing glycine (without Fe complex) at a concentration of 7.5 g/L. The diamonds represent a solution containing an Fe complex, namely 1 g/L ferricyanide, without glycine. The squares represent a solution containing both 7.5 g/L glycine and 1 g/L ferricyanide.

It is evident that in the absence of moderate heating (ie, to >40° C.), and catalysts such as copper, leaching of gold ore using glycine alone yields very low gold recovery at room temperature. The recovery from leaching with a solution containing ferricyanide is slightly higher. However, there a significant improvement in recovery (around an order of magnitude) when the ore is leached with a solution containing both glycine and the ferricyanide together. The gold recovery increased to approximately 76% after 48 hours of leaching.

Figure 2:
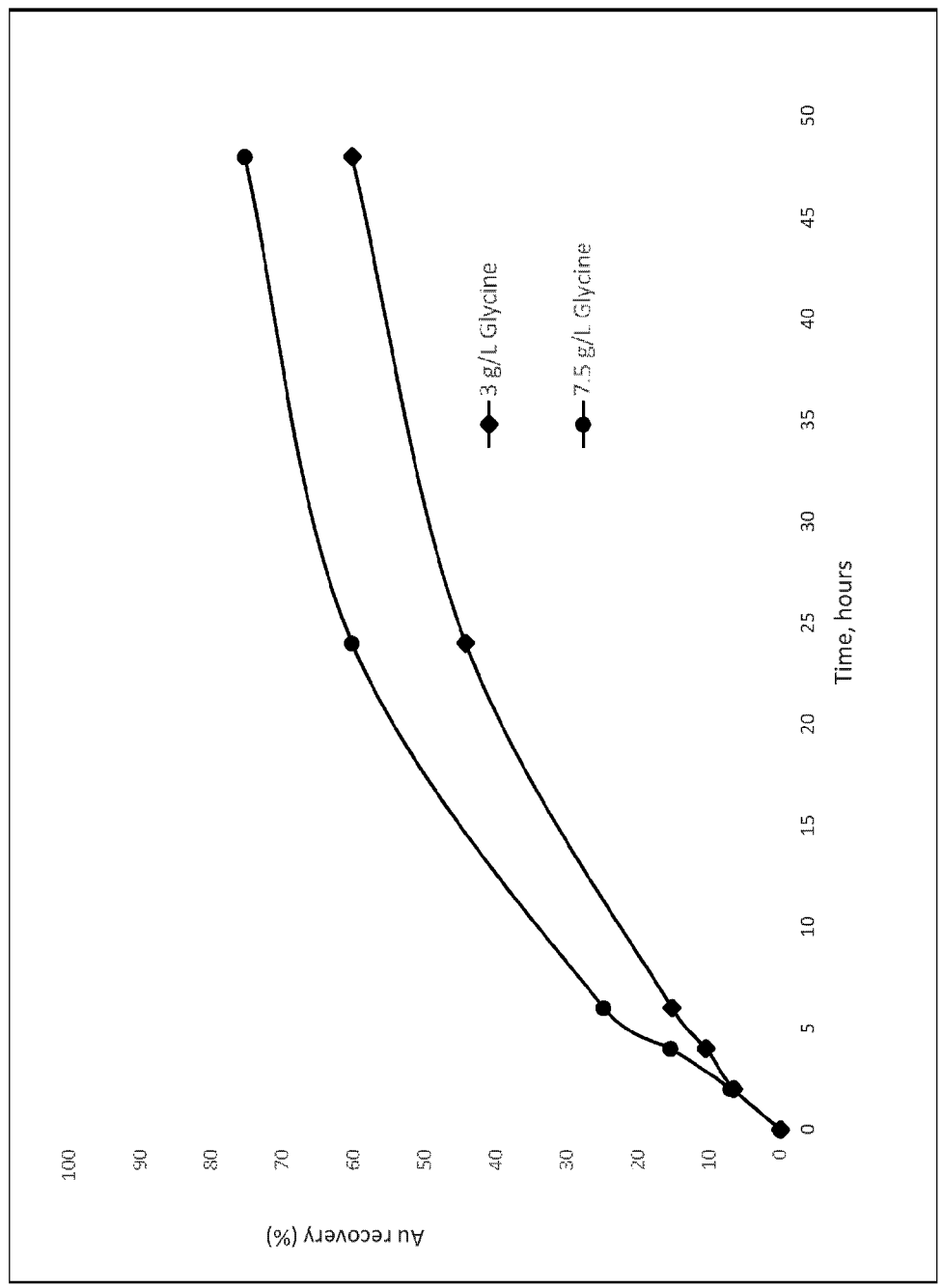
FIG. 2 is a graph of gold recovery (%) versus time (hours) for leaching gold ore using Fe complex plus glycine leaching solutions at 3 g/L glycine (diamonds) and 7.5 g/L glycine (circles).

FIG. 2 shows gold recovery versus time for leaching gold ore at room temperature, a pH of 11.0 and a solids content of 33.3% (by weight) using Fe complex plus glycine leaching solutions at 3 g/L glycine (diamonds) and 7.5 g/L glycine (circles). It can be seen that doubling the glycine concentration at a given concentration of Fe complex increases the gold recovery by around 15% after 48 hours leaching.

Figure 3:
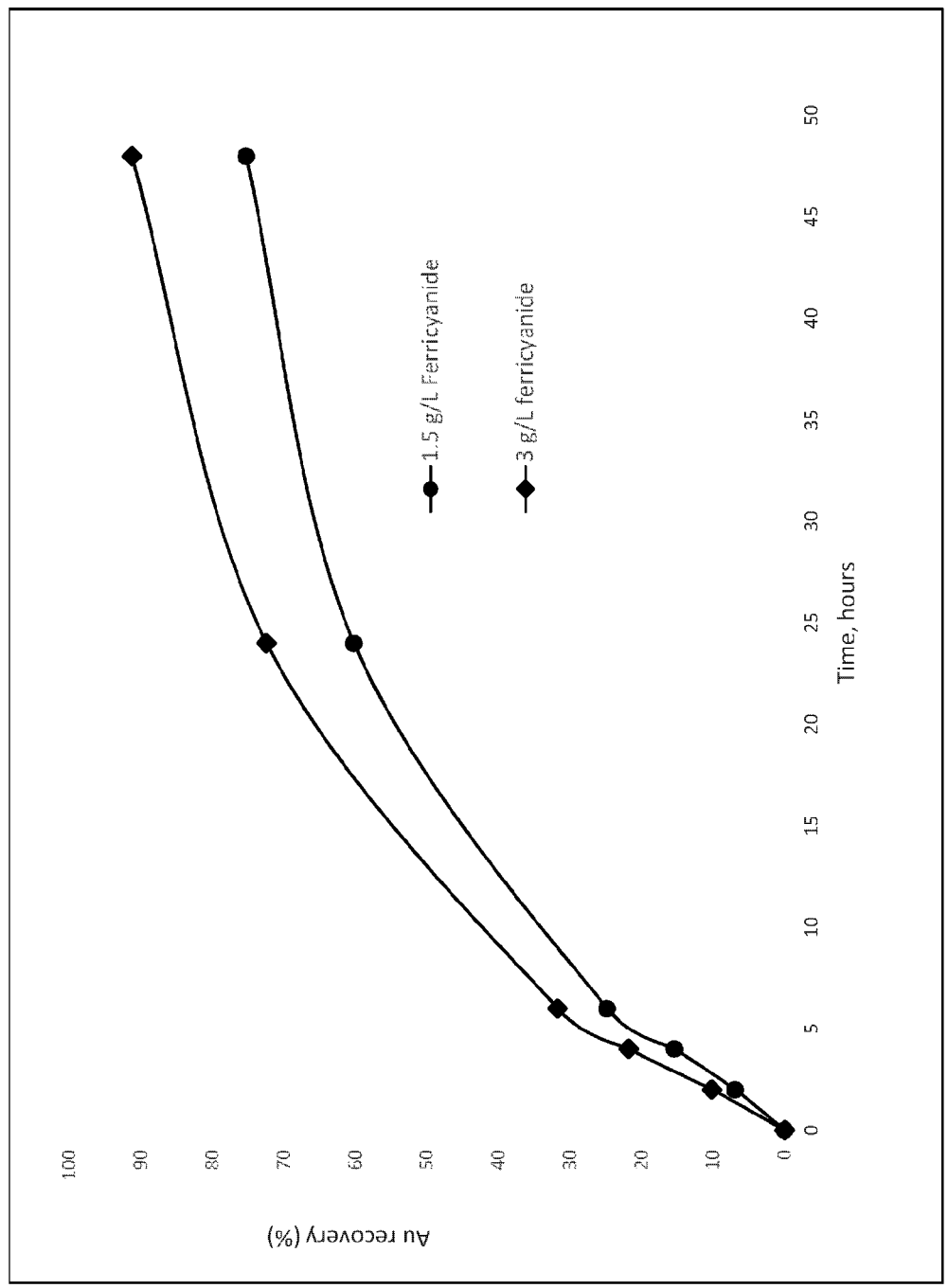
FIG. 3 is a graph of gold recovery (%) versus time (hours) for leaching gold ore using Fe complex plus glycine leaching solutions at 3 g/L ferricyanide (diamonds) and 1.5 g/L ferricyanide (circles).

FIG. 3 shows gold recovery versus time for leaching gold ore at room temperature, a pH of 11.0 and a solids content of 33.3% (by weight). using Fe complex plus glycine leaching solutions at 3 g/L ferricyanide (diamonds) and 1.5 g/L ferricyanide (circles). It can be seen that doubling the ferricyanide concentration at a given concentration of glycine increases the gold recovery by around 15% after 48 hours leaching.

Figure 4:
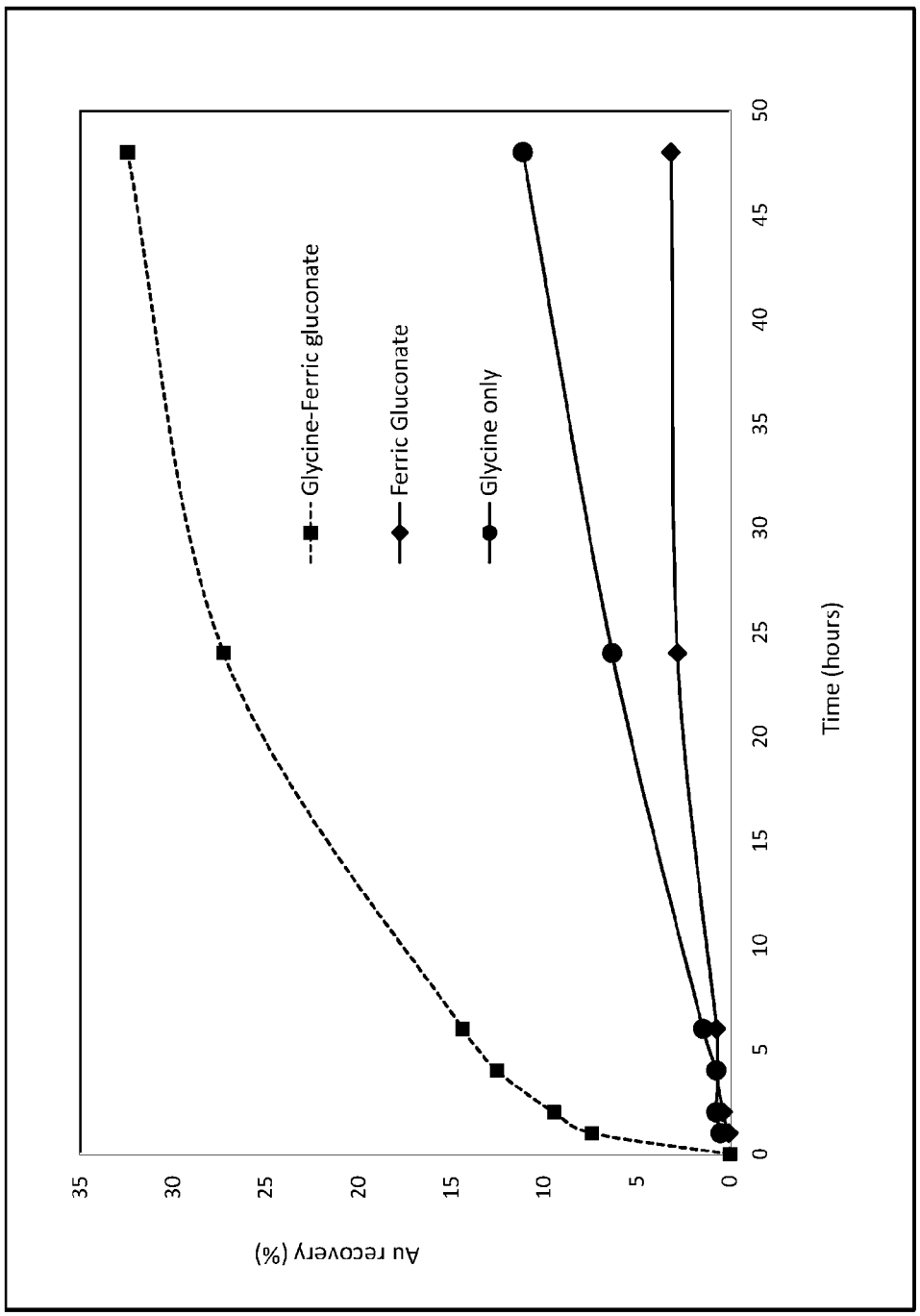
FIG. 4 is a graph of gold recovery (%) versus time (hours) for leaching gold ore using three different leaching solutions at 50° C.: Fe complex only (diamonds), glycine only (circles) and Fe complex plus glycine (squares).

FIG. 4 is a graph of gold recovery versus time for leaching gold ore using three different leaching solutions at an elevated temperature of 50° C., a pH of 11.0 and a solids content of 40% (by weight). The respective solutions contained Fe complex (4.5 g/L Ferric gluconate) only (diamonds), 7.5 g/L glycine only (circles) and Fe complex (4.5 g/L Ferric gluconate) plus 7.5 g/L glycine (squares). While the elevated temperature did improve gold recovery for solutions containing glycine or Fe complex only, there was a significant improvement in gold recovery when leaching was conducted with a solution containing both glycine and Fe complex. It is also evident that the overall gold recovery using glycine and ferricyanide at room temperature (see FIG. 1) is greater (75%) than using glycine and Ferric gluconate at elevated temperature (33%) for comparative leach times of 48 hours.

Figure 5:
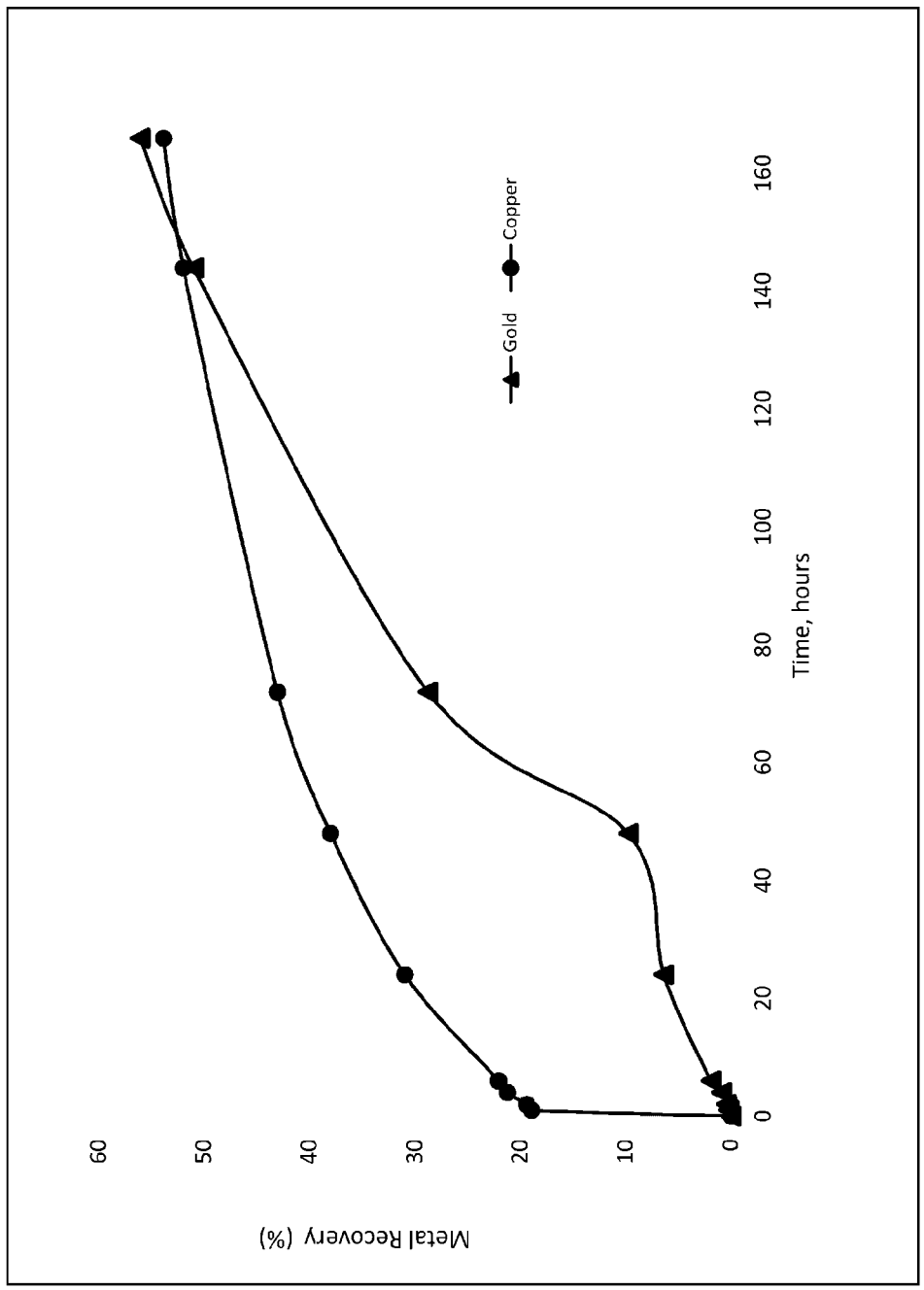
FIG. 5 is a graph of gold and copper recovery (%) versus time (hours) for leaching gold-copper containing ore using a leaching solution containing glycine and ferricyanide.

FIG. 5 is a graph of gold and copper recovery from gold-copper ore containing chalcopyrite and chalcocite as the main source of copper in the ore. The leach solutions containing 2 g/L glycine and 1.8 g/l ferricyanide. The leaching was conducted at 45% solids, pH 10.5 and room temperature. The results demonstrate that both copper and gold may be effectively leached using the present process. Under the conditions of this test, it is noted that the initial leaching rate for copper was higher than for gold, with the rate decreasing over time. In contrast, the leaching rate for gold was generally higher than for copper after approximately 48 hours leaching time.

Figure 6:
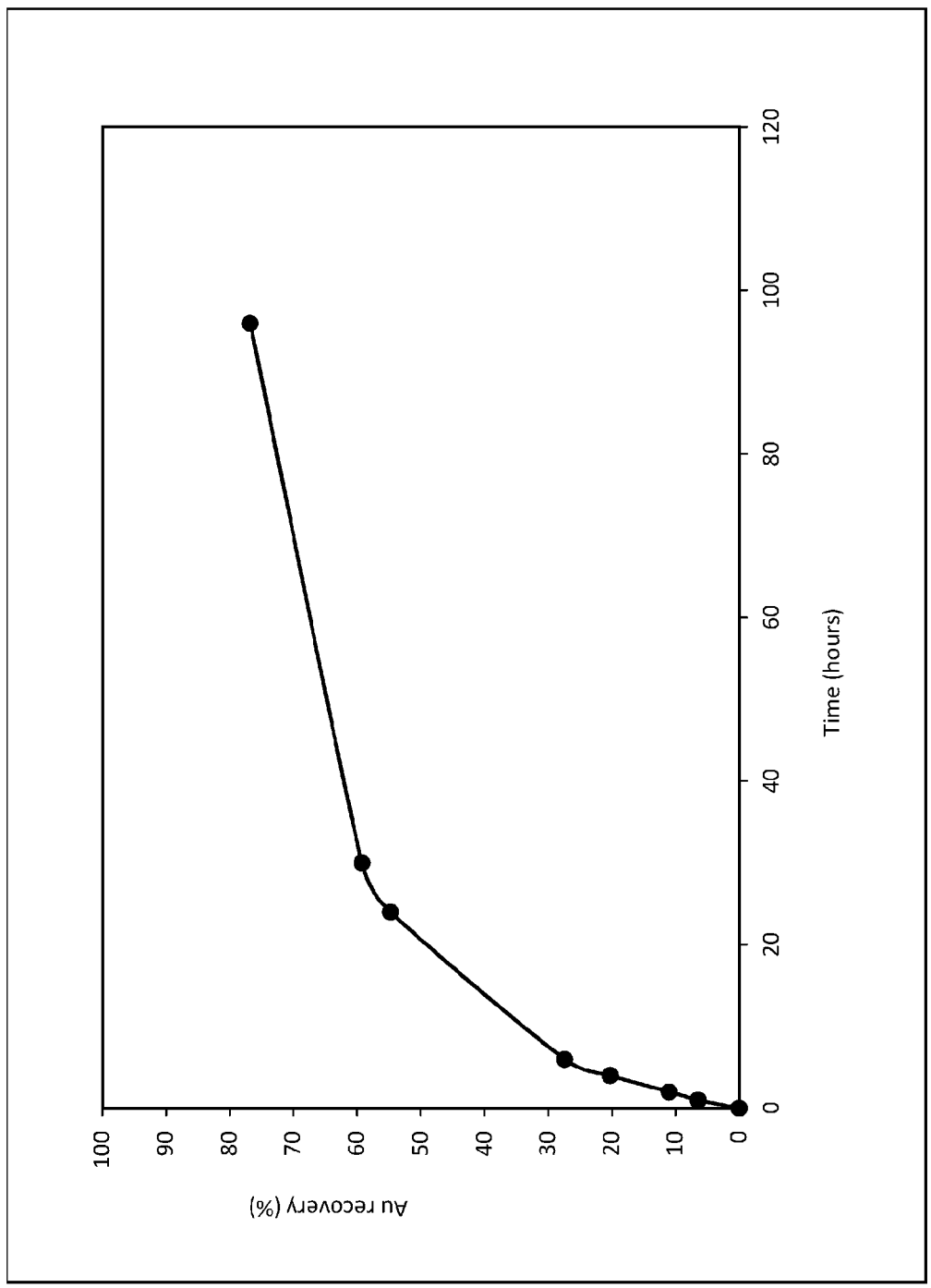
FIG. 6 is a graph of gold recovery (%) versus time (hours) for leaching gold ore using a leaching solution containing glycine and potassium permanganate.

FIG. 6 is a graph of gold recovery versus time for leaching gold ore using solutions containing 15 g/L glycine in the presence of 2.0 g/L potassium permanganate at pH 11.0 and 55° C. and a solids content of 30% (by weight). Upon comparison with FIG. 1, it can be seen that gold dissolution is also enhanced when the ore is leached with a solution containing both glycine and a permanganate (potassium permanganate). Under the conditions of this test, gold dissolution reaches approximately 77% after 96 hours of leaching. Therefore, under the respective process conditions of FIGS. 1 and 6, the rate of gold recovery is higher in the presence of ferricyanide than in the presence of permanganate.

Figure 7:
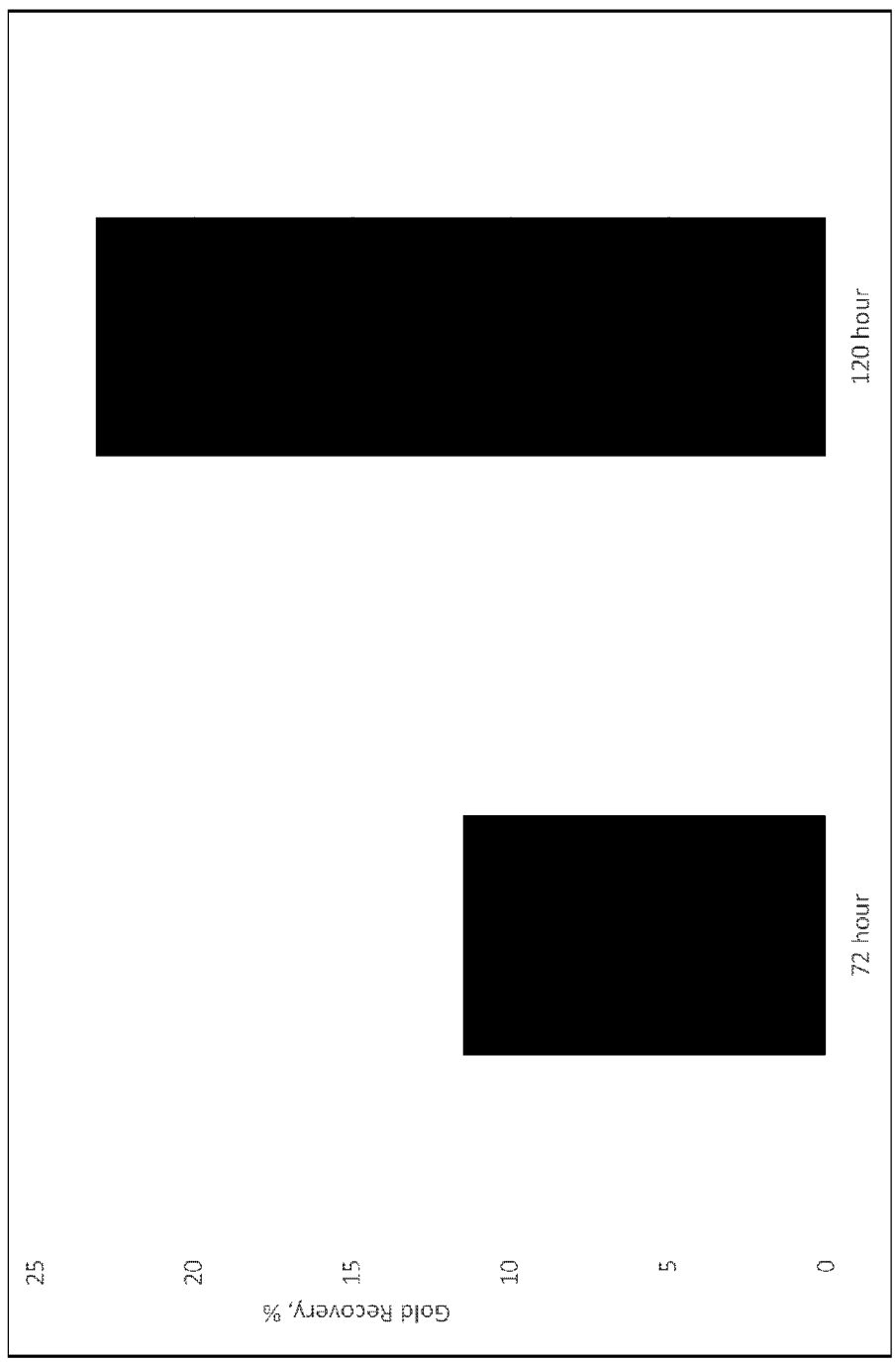
FIG. 7 is a graph of gold recovery (%) after leaching gold ore at 72 hours and 120 hours using solutions containing glycine and sodium chromate.

FIG. 7 is a graph of gold recovery after 72 hours and 120 hours for leaching gold ore using solutions containing 15 g/L glycine in the presence of 2.0 g/L sodium chromate at pH 10.5 and 23° C. and a solids content of 30% (by weight). The results indicate that gold dissolution may be enhanced by leaching with a solution containing both glycine and an alkaline-stable transition metal complex comprising sodium chromate. Under the conditions of this test, the rate of gold dissolution using a solution containing sodium chromate is generally lower than that achieved using solutions containing any of ferricyanide, ferric gluconate and potassium permanganate.

Figure 8:
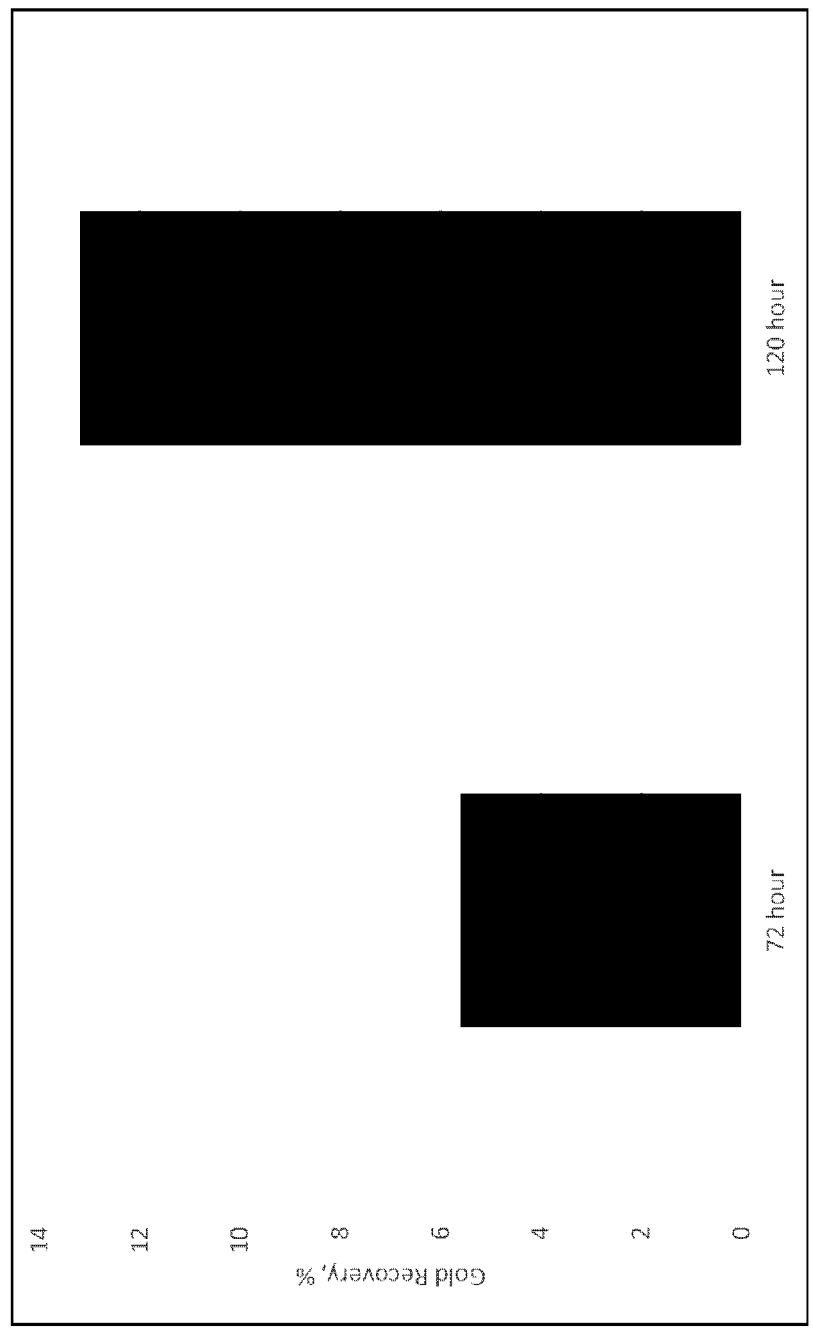
FIG. 8 is a graph of gold recovery (%) after 72 hours and 120 hours for leaching gold ore using solutions containing glycine and cerium nitrate.

FIG. 8 is a graph of gold recovery after 72 and 120 hours for leaching gold ore using solutions containing 15 g/L glycine in the presence of 2.3 g/L cerium nitrate at pH 10.5 and 23° C. and a solids content of 30% (by weight). The results indicate that gold dissolution may be enhanced by leaching with a solution containing both glycine and an alkaline-stable transition metal complex comprising cerium nitrate. Under the conditions of this test, the rate of gold dissolution using a solution containing cerium nitrate is generally lower than that achieved using solutions containing any of ferricyanide, ferric gluconate, potassium permanganate and sodium chromate.

Figure 9:
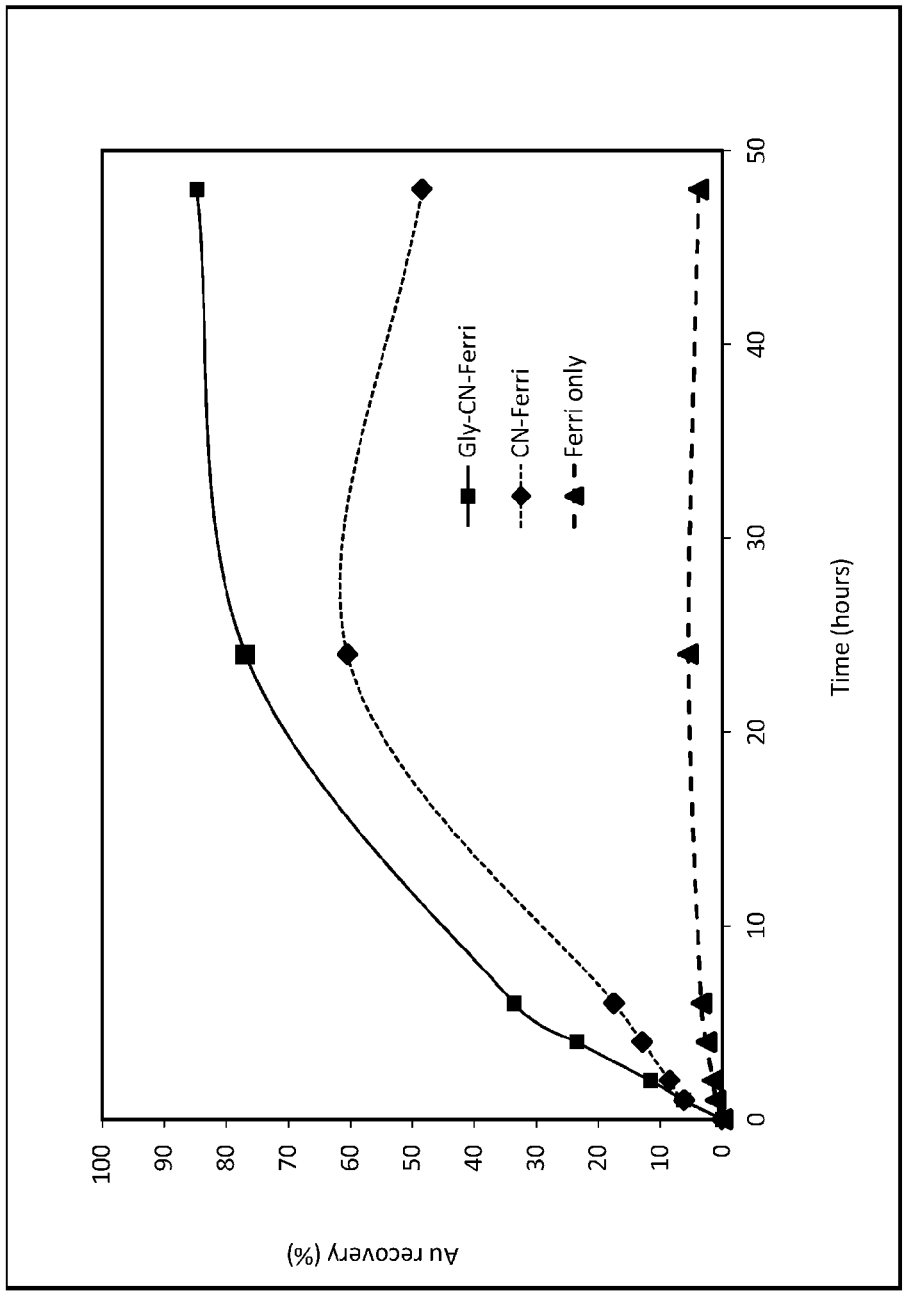
FIG. 9 is a graph of gold recovery (%) versus time (hours) for leaching gold ore using solutions containing ferricyanide only (triangles), ferricyanide and NaCN (diamonds), and glycine, ferricyanide and NaCN (squares).

FIG. 9 is a graph of gold recovery versus time for leaching gold ore using solutions containing ferricyanide only (triangles), ferricyanide and NaCN (diamonds), and glycine, ferricyanide and NaCN (squares). Where present, the concentrations of the various components in solution are 2 g/L glycine, 1.0 g/L ferricyanide and 10 ppm NaCN. The solutions each had a pH of 10.5, ambient temperature (23° C.) and a solids content of 40% (by weight). The results show that while moderate levels of gold are recovered using a solution containing ferricyanide and NaCN, the recovery is significantly enhanced when glycine is also added to the solution. The overall recovery is approximately 85% after 48 hours leaching. The results indicate that neither ferricyanide nor NaCN are themselves present in sufficient concentration to achieve economic extraction of the precious or chalcophile metals in the absence of additional lixiviant (ie amino acid).

Figure 10:
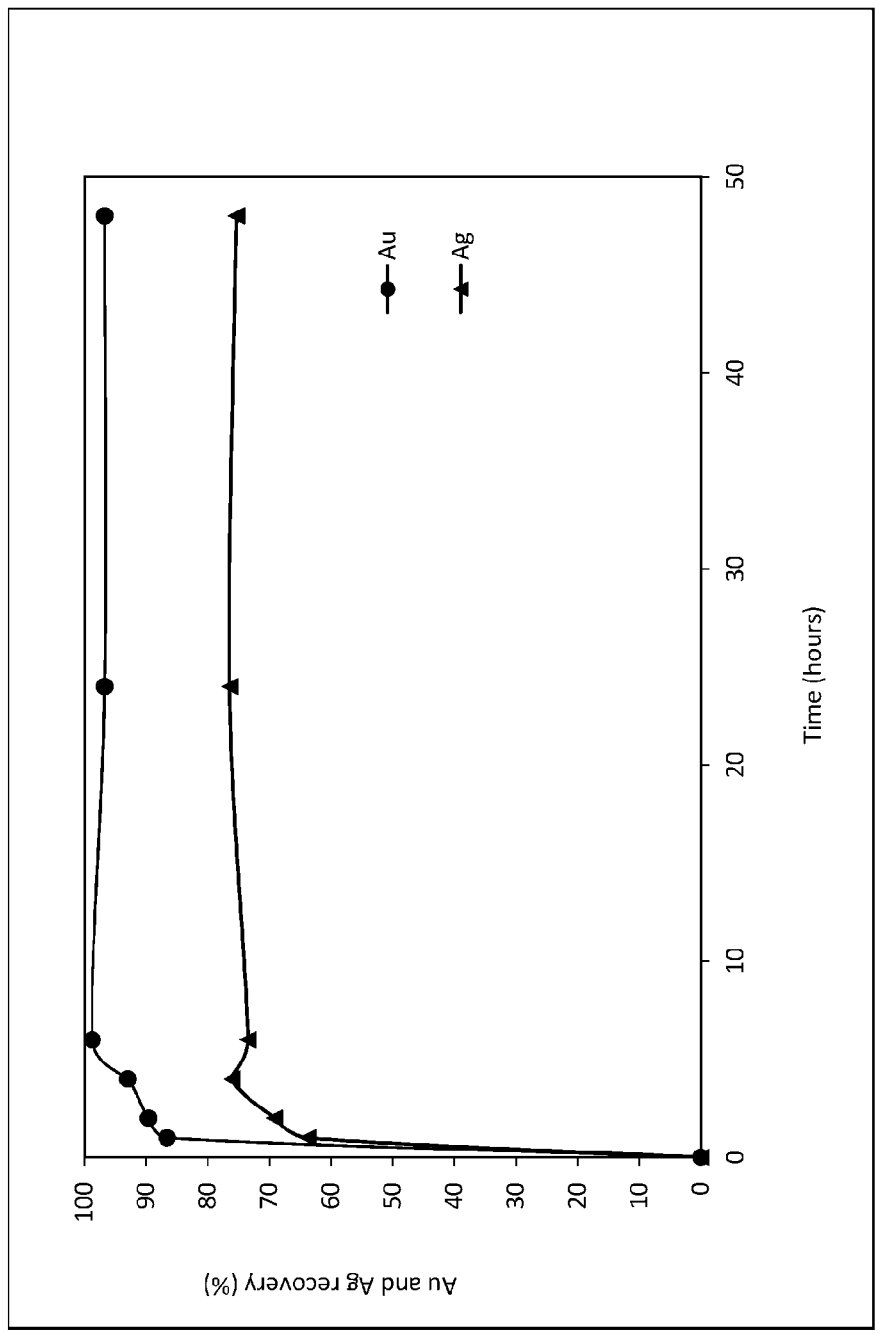
FIG. 10 is a graph of gold and silver recovery (%) versus time (hours) for leaching high silver gold ore using solution containing glycine, ferricyanide and NaCN.

FIG. 10 is a graph of gold (circles) and silver (triangles) recovery versus time for leaching high silver gold ore using solutions containing 7.5 g/L glycine in the presence of 1.5 g/L ferricyanide and 200 ppm NaCN at pH 10.5, ambient temperature (23° C.) and a solids content of 40% (by weight). The rate of gold dissolution was very high, with maximum gold recovery of greater than 95% achieved after only 6 hours of leaching. Silver recovery was also very good, with a maximum recovery of about 76% achieved after 6 hours of leaching. The leaching rate was enhanced by the presence of a low concentration of NaCN which acted as a leaching catalyst.

EXAMPLES

Non-limiting Examples of a process for recovery of one or more precious metal and/or chalcophile metal will now be described.

Example 1

A gold ore was leached in an aqueous pulp containing 33.3% solids at room temperature (20 degrees Celsius) at a pH of 11. Leaching was conducted in three solutions containing: (a) glycine only, (b) Fe complex only and (c) glycine and Fe complex. The following was noted during bottle roll tests:
 (a) For the case of using glycine only (using 7.5 g/L), in the absence of any alkali-stable transition metal complex, the gold extraction into solution is only about 1% after 48 hours leaching.
 (b) For the case of the alkali-stable transition metal complex only (potassium ferricyanide in this case, at a concentration of 1 g/L) the gold extraction into solution is only about 5%) after 48 hours leaching.
 (c) However, when 7.5 g/L glycine and 1 g/L ferricyanide are used in combination, the gold extraction/leaching into solution is around 75% after 48 hours leaching.

Thus the combination of the two reagents gives an outcome that is not just the sum of the effects, but a multiple of 15-75 times the effect of any single reagent when used on its own, all other conditions being the same.

Example 2

An ore material containing gold, nickel, copper, cobalt and zinc was leached in a solution containing 15 g/L glycine in the presence of 2.0 g/L permanganate at pH 11.0, a temperature of 55° C. and a solids content of 30% (by weight). Table 1 lists the concentrations of elements in the leachate after 120 hours leaching. These results indicate that the recovery of gold, nickel, copper, cobalt and zinc was 77, 30, 55, 25 and 40% respectively.

TABLE 1

| Sample UNITS | Au mg/L | Cu mg/L | Co mg/L | Fe mg/L | Si mg/L | Al mg/L | Ni mg/L | Zn mg/L |
|---|---|---|---|---|---|---|---|---|
| Glycine-permanganate | 0.894 | 3 | 2.2 | BDL | 8 | BDL | 3.8 | 2.5 |
| Extraction, % | 77.0 | 55.0 | 25.0 | <BDL | <0.02 | <BDL | 30.0 | 40.0 |

*BDL = below detection limit

The data indicates that under the specified leaching conditions, the process results in very high recovery of precious metal (gold) and moderate to high recovery of the chalcophile elements copper, cobalt, nickel and zinc. However, the dissolution of the undesirable non-chalcophile elements, iron, aluminium and silicon was very low, indicating the preferential leaching of target metals over the undesirable elements using this process.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

What is claimed is:

1. A process for recovery of one or more elements, selected from precious metals and chalcophile metals, as herein defined, from materials containing precious and/or chalcophile metal/s, said process including:
 contacting the material with an alkaline solution containing a lixiviant comprising an amino acid, or derivative thereof, and a rate enhancer comprising an alkali stable transition metal complex in order to form a leachate containing complexes of the precious metal with the amino acid and/or complexes of the chalcophile metal with the amino acid; and
 (ii) recovering the precious metal and/or chalcophile metal from the leachate
 wherein the amino acid concentration is greater than 0.05 g/L and the concentration of alkali stable transition metal complex is a minimum of 0.05 g/L and
 wherein the amino acid is one or more of glycine, histidine, valine, alanine, phenylalanine, cysteine, aspartic acid, glutamic acid, lysine, methionine, serine, threonine, and tyrosine.

2. The process of claim 1, wherein the amino acid concentration is less than 250 g/L.

3. The process of claim 1, wherein the amino acid concentration is greater than 0.1 g/L.

4. The process of claim 1, wherein the amino acid concentration is less than 30 g/L.

5. The process of claim 1, wherein the alkali stable transition metal complex is an iron complex or a manganese complex.

6. The process of claim 1, wherein the pH of the alkaline solution is at least 7.

7. The process of claim 1, wherein the pH of the alkaline solution is at least 8.

8. The process of claim 1, wherein the temperature of the process is between −5 and 90 degrees Celsius.

9. The process of claim 1, wherein the temperature of the process is ambient temperature.

10. The process of claim 1, wherein the alkali stable transition metal complex includes ligands selected from carboxylic and dicarboxylic acid salts, pH-stable cyanide complexes, hydroxy-carboxylic acids and their salts, and ethylene diamine tetra-acetic acid (EDTA) and its salts.

11. The process of claim 1, wherein the alkali stable transition metal complex comprises one or more of chromate, permanganate, manganate, titanate, ferrate, and vanadate.

12. The process of claim 1, wherein the alkali stable transition metal complex comprises one or more of ferrocyanide, ferricyanide, ferro gluconate, ferri gluconate, ferro citrate, ferri citrate, ferro/ferri tartrate, ferro/ferri ethylene diamine tetra-acetic acid (EDTA) salt.

13. The process of claim 1, wherein the alkali stable transition metal complex comprises one or more of ferro/ferricyanide, ferric gluconate and ferric EDTA.

14. The process of claim 1, wherein the transition metal in the alkali stable transition metal complex is partially substituted by one or more of ammonium ions, alkali metal ions and alkali earth metal ions.

15. The process of claim 1, wherein the concentration of alkali stable transition metal complex is less than 50 g/L.

16. The process of claim 1, wherein the concentration of alkali stable transition metal complex is a minimum of 0.1 g/L.

17. The process of claim 1, wherein the concentration of alkali stable transition metal complex is less than 10 g/L.

18. The process of claim 1, wherein the alkaline solution further includes an oxidant selected from the group comprising air, oxygen, hydrogen peroxide, calcium peroxide, sodium peroxide, ammonium peroxide manganese dioxide or permanganate.

* * * * *